United States Patent

[11] 3,547,157

| [72] | Inventor | Roger Layton Jacklin<br>Waterloo, Iowa |
|---|---|---|
| [21] | Appl. No. | 834,640 |
| [22] | Filed | June 19, 1969 |
| [45] | Patented | Dec. 15, 1970 |
| [73] | Assignee | Deere & Company<br>Moline, Ill.<br>a corporation of Delaware |

[54] PRESSURE-MODULATING VALVE
13 Claims, 2 Drawing Figs.

[52] U.S. Cl. .................................................... 137/625.26,
137/625.28, 251/331
[51] Int. Cl. ...................................................... F16k 11/02
[50] Field of Search .......................................... 137/625.2,
625.25, 625.26, 625.27, 625.28; 251/Curtin valve,
61, 331

[56] References Cited
UNITED STATES PATENTS
2,720,218 10/1955 Otto ............................. 137/625.28X
2,679,863 6/1954 Tucker ......................... 137/625.28

Primary Examiner—Henry T. Klinksiek
Attorneys—H. Vincent Harsha, Harold M. Knoth, William A. Murray, John M. Nolan and Jimmie R. Oaks ABSTRACT: A pressure-modulated valve has a valve stem axially shiftable in a valve bore and a torus-shaped, hollow diaphragm is in fluidtight engagement with the bore and has inner and outer annular ribs secured respectively to the valve stem and bore. The diaphragm is pressurized by a source of fluid under pressure and is operative, through a rolling action on the bore and stem induced by shifting the valve stem, to selectively block a return outlet in the bore while simultaneously uncovering an outlet in the diaphragm adjacent the stem or to uncover the return outlet while simultaneously blocking the diaphragm outlet. The pressure in the diaphragm acts to alternately effectively seal its outlet against the stem and its outer wall over the return outlet.

PATENTED DEC 15 1970          3,547,157

*INVENTOR.*
ROGER L. JACKLIN

PRESSURE-MODULATING VALVE

BACKGROUND OF THE INVENTION

This invention relates to a hydraulic function control means and more particularly to improvements in valve means for achieving pressure modulation in controlling engagement of fluid pressure operated clutches and brakes, or the like.

Heretofore, many modulating valves have included metal, spool-type valve members which are axially shiftable in a valve bore to control fluid flow. Spool valves require close tolerances between the lands of the spool and the bore to prevent excessive leakage around the lands and such a tight fit has a disadvantage in pressure-modulating operation since the valve tends to stick, then all at once slip, causing pressure surges or pressure spikes which result in abrupt engagement instead of the desired smooth engagement of the function being controlled.

SUMMARY OF THE INVENTION

The primary object of the invention is to provide an improved pressure-modulating valve which will permit gradual application or engagement of a hydraulic function such as a clutch or brake.

A more specific object is to provide a valve member which may freely move in a valve bore during pressure-modulating operation and which will prevent excessive leakage between the ports through which flow is being controlled.

A further object is to provide such a valve member in the form of a hollow, torus-shaped diaphragm which is axially shiftable or deformable in the valve bore to selectively block a return outlet and which is connected to a source of fluid under pressure so that the wall thereof will be pressurized over the return outlet and prevent leakage of pressurized fluid therethrough.

Another object is to provide such a valve member with a valve stem which is connected to the diaphragm and which cooperates therewith to block a pressure outlet port in the diaphragm and which cooperates with a dump valve to uncover a second return outlet when a hydraulic function is disengaged.

Still a further object is to provide such a valve wherein manufacturing tolerances are not critical, resulting in reduced costs and maintenance.

These and other objects will become apparent from a consideration of the following detailed description and the drawings.

DESCRIPTION OF THE PREFERRED EMBODIMENT

Figure 1:
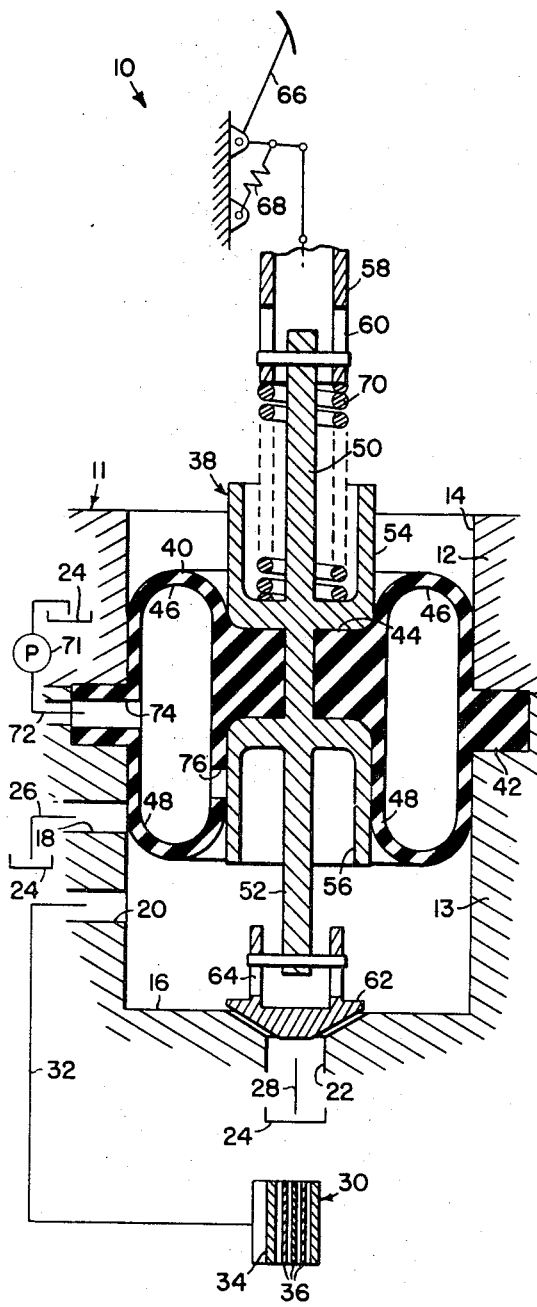
FIG. 1 is a schematic illustration of a control system embodying the invention, showing the system in a condition wherein the controlled function is fully disengaged, and showing the pressure-modulating valve in section.

A representative control system is designated in the drawings by the numeral 10 and includes a valve body 11 made-up of upper and lower portions 12 and 13, respectively, in which is formed a bore 14 having an end 16. The bore 14 is intersected by a return outlet 18 and a control outlet 20 and has an axial, second, larger return outlet 22 in the end 16. The return outlets 18 and 22 are connected to a reservoir 24 by means of conduits 26 and 28, respectively, and the control outlet 20 is connected to a hydraulic function 30 by means of a conduit 32. The hydraulic function 30 is representative of the type of functions requiring pressure modulation such as disc brakes or clutches and includes an operating piston 34 and friction plates 36, it being understood that the structure shown is for illustrative purposes only.

The flow of pressurized fluid to the function 30 and pressure modulation is controlled by a valve member 38, which includes a hollow, torus-shaped diaphragm 40 having an outer annular rib 42 sandwiched between the upper and lower body portions 12 and 13 and an inner rib 44, the ribs 42 and 44 being interconnected by upper and lower wall portions 46 and 48, respectively. The valve member 38 further includes a valve stem 50 having an axial central portion 52 with upper and lower, axially spaced, opposite, cuplike portions 54 and 56, the bases of which are on opposite sides of and in holding engagement with the rib 44 of the diaphragm 40. A plunger 58 is connected to the upper end of the stem 50 through a lost-motion connection 60 and a dump valve 62, for controlling flow to the return outlet 22, is connected to the lower end of the stem 50 through a lost-motion connection 64. The plunger 58 is connected to a conventional manual actuating means, here shown as a pedal 66 having a return spring 68. The pedal 66 acts through the plunger 58 and a modulating spring 70 to exert an actuating force on the valve stem 50.

Figure 2:
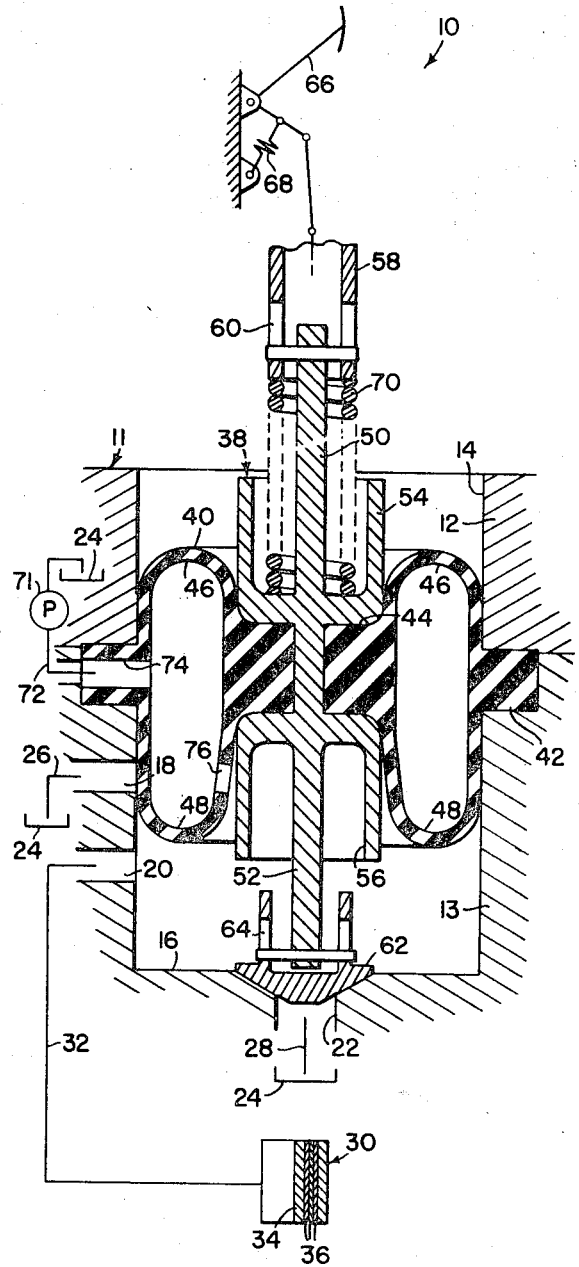
FIG. 2 is a view similar to FIG. 1 but showing the system in the condition wherein the controlled function is fully engaged.

A pump 71 is connected to the reservoir 24 and delivers fluid under pressure via a conduit 72 to an inlet 74 in the rib 42 of the diaphragm 40. An outlet 76 in the lower wall portion 48 of the diaphragm adjacent the lower cup portion 56 of the valve stem 50 permits pressurized fluid to flow into the bore 14 when the valve stem is shifted to expose the outlet 76 to the bore as shown in FIG. 2.

In operation, to disengage the function 30, the actuating pedal 66 is depressed against the bias of the return spring 68, thereby moving the plunger 58 and the stem 50 upwardly as shown in FIG. 1. This movement brings the inner area of the lower wall portion 48 of the diaphragm 40 having the outlet 76 into tight engagement with the lower cuplike portion 56 of the stem and blocks fluid pressure from the pressurized interior of the diaphragm 40 to the bore 14 and, at the same time, rolls the outer peripheral area of the lower wall portion 48 of the diaphragm axially in the bore to expose the return outlet 18 and lifts the dump valve 62 from the return outlet 22. Since there is no pressure supplied to the piston 34, it and the friction plates 36 separate and consequently disengage the function.

To engage the function 30, the operator gradually releases the pedal 66, which is biased toward an engaged position by the return spring 68, thereby moving the plunger 58 downwardly in the drawings. This movement is transmitted through the modulating spring 70 to the valve stem 50 and initial movement permits the dump valve to seat over the return outlet 22. Further downward stem movement rolls the lower wall portion 48 of the diaphragm over the return outlet 18 and simultaneously opens the outlet 76, transmitting fluid pressure to the bore 14, controlling outlet 20, and conduit 32 to the piston 34. The system pressure inside the diaphragm 40 acts to effectively seal the return outlet 18.

The valve member 38 will not start to modulate until the control pressure exceeds a value predetermined by the preload of the modulating spring 70. When the control pressure reaches this predetermined value the force created by the fluid pressure in the bore 14 acting on the bottom of the valve member 38 balances the force exerted by the modulating spring 70. Additional control pressure moves the stem 50 upwardly, this movement being allowed by the lost-motion connections 60 and 64, and the stem in turn deflects the modulating spring 70 and rolls the diaphragm 40 to close the outlet 76. Further release of the actuating means again moves the plunger and stem downwardly, opening the outlet 76 until the increased pressure in the valve bore 14 causes sufficient deflection of the modulating spring to again close the outlet 76. The control pressure is thus a function of the position of the actuating means and the pressure will increase in proportion to the deflection of the modulating spring 70.

I claim:

1. In a modulating valve of the type including a valve bore having return and control outlets, a controlled function connected to the control outlet, a source of fluid under pressure in communication with the bore, a valve member including a valve stem axially shiftable in the bore, an actuating means having a lost-motion connection with the valve stem, and a pressure-modulating spring acting between the actuating means and the valve stem biasing the valve stem towards its function-engaging position whereby the control pressure is responsive to the position of the actuating means, the improvement wherein the valve member includes a hollow, pressurized diaphragm in fluidtight engagement with the bore, the diaphragm being shiftable in response to valve stem movement to selectively connect the source of fluid to the controlled function or connect the controlled function to the return outlet.

2. The invention defined in claim 1 wherein the diaphragm includes an outer portion fixed in the bore, an inner portion secured to the valve stem and an inlet connected to the source of fluid under pressure, and an outlet means in one of said valve stem and diaphragm adjacent their connection with each other, the valve stem and the diaphragm cooperating to admit fluid pressure into the bore when the valve stem is moved towards its function-engaging position.

3. The invention defined in claim 2 wherein the outlet means is formed in said diaphragm.

4. The invention defined in claim 3 and including a second return outlet formed in the bore in axial alignment with the valve stem and dump valve means having a lost-motion connection with the valve stem for removal from the second return outlet when the valve stem reaches its position for disengaging the function.

5. The invention defined in claim 2 wherein the diaphragm is torus-shaped and has an outer annular rib fixed in the bore and the valve stem is centrally connected to the diaphragm.

6. The invention defined in claim 5 wherein the inlet is formed in the outer rib of the diaphragm.

7. The invention defined in claim 5 and including a second return outlet formed in the bore in axial alignment with the valve stem and dump valve means having a lost-motion connection with the valve stem for removal from the second return outlet when the valve stem reaches its position for disengaging the function.

8. The invention defined in claim 2 and including a second return outlet formed in the bore in axial alignment with the valve stem and dump valve means having a lost-motion connection with the valve stem for removal from the second return outlet when the valve stem reaches its position for disengaging the function.

9. A control valve comprising a valve bore having a fluid pressure inlet and return and control outlets, a valve member including a valve stem axially shiftable in the bore, and a hollow, pressurized diaphragm in fluidtight engagement with the bore operatively connected to and shiftable in response to valve stem movement between first and second operative positions for respectively connecting said fluid pressure inlet to said control outlet or connecting said control outlet to said return outlet.

10. The invention defined in claim 9 wherein the diaphragm includes an outer portion fixed in the bore, an inner portion secured to the valve stem and an inlet connected to said fluid pressure inlet and an outlet means in one of said valve stem and diaphragm adjacent their connection with each other, the valve stem and diaphragm cooperating to provide fluid communication between said fluid pressure inlet and the bore when said valve stem is shifted to said first operative position.

11. The invention defined in claim 10 wherein the outlet means is formed in said diaphragm.

12. The invention defined in claim 10 wherein the diaphragm is torus-shaped and has an outer annular rib fixed in the bore and the valve stem is centrally connected to the diaphragm.

13. The invention defined in claim 12 wherein the inlet is formed in the outer rib of the diaphragm.